(12) United States Patent
Kurashige

(10) Patent No.: US 10,656,409 B2
(45) Date of Patent: May 19, 2020

(54) ILLUMINATION DEVICE

(71) Applicant: Dai Nippon Printing Co., Ltd., Tokyo (JP)

(72) Inventor: Makio Kurashige, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/736,481

(22) PCT Filed: Jun. 21, 2016

(86) PCT No.: PCT/JP2016/068427
§ 371 (c)(1),
(2) Date: Dec. 14, 2017

(87) PCT Pub. No.: WO2016/208594
PCT Pub. Date: Dec. 29, 2016

(65) Prior Publication Data
US 2018/0188525 A1 Jul. 5, 2018

(30) Foreign Application Priority Data
Jun. 22, 2015 (JP) ................. 2015-124935

(51) Int. Cl.
| G02B 26/10 | (2006.01) |
| G02B 5/32 | (2006.01) |
| G02B 27/48 | (2006.01) |
| F21V 13/02 | (2006.01) |
| F21V 14/00 | (2018.01) |
| G02B 3/00 | (2006.01) |
| F21Y 115/30 | (2016.01) |

(52) U.S. Cl.
CPC ............ *G02B 26/101* (2013.01); *F21V 13/02* (2013.01); *F21V 14/006* (2013.01);
(Continued)

(58) Field of Classification Search
CPC .............. G02B 5/32; G02B 2027/0174; G02B 26/0841; G02B 26/108; G02B 27/017;
(Continued)

(56) References Cited

U.S. PATENT DOCUMENTS 9,777,901 B2  10/2017  Reinprecht et al.
9,851,581 B2  12/2017  Kurashige
(Continued)

FOREIGN PATENT DOCUMENTS

CN    107107807 A    8/2017
EP    3 216 650 A1   9/2017
(Continued)

OTHER PUBLICATIONS

English translation of International Preliminary Report on Patentability (Chapter I) (Application No. PCT/JP2016/068427) dated Jan. 4, 2018, 7 pages.
(Continued)

*Primary Examiner* — Collin X Beatty
*Assistant Examiner* — Grant A Gagnon
(74) *Attorney, Agent, or Firm* — Burr & Brown, PLLC

(57) ABSTRACT

Provided is an illumination device capable of illuminating a partial range in an illumination range at higher or lower brightness than the other ranges without the need of a complicated processing configuration. The illumination device includes a coherent light source that emits a coherent beam, an optical element 3 including a plurality of diffusion subelements 15-1 to 15-9 each of which guides the coherent beam incident thereon, such that the coherent beam illuminates a corresponding one of illumination object subregions 19-1 to 19-9, and an optical scan unit that guides the coherent beam emitted from the coherent light source and thereby scans the coherent beam on the plurality of diffusion subelements 15-1 to 15-9. The plurality of diffusion subelements 15-1 to 15-9 include diffusion subelements differing in size.

12 Claims, 8 Drawing Sheets

(52) U.S. Cl.
CPC .............. *G02B 3/0006* (2013.01); *G02B 5/32* (2013.01); *G02B 27/48* (2013.01); *F21Y 2115/30* (2016.08)

(58) Field of Classification Search
CPC ............ G02B 27/0172; G02B 27/0911; G02B 27/0966; G02B 27/1073; G02B 27/108; G02B 27/4238; A61B 3/113; A61B 3/12; A61B 3/14; G06F 3/013; G09G 5/00; G11B 7/0065; G11B 7/1263; G11B 7/1353; G11B 7/1395; H01S 2302/00; H01S 5/005; H01S 5/0687; H01S 5/141
USPC .......................................................... 359/17
See application file for complete search history.

(56) References Cited

U.S. PATENT DOCUMENTS

| | | |
|---|---|---|
| 2009/0168424 A1 | 7/2009 | Yamauchi et al. |
| 2013/0170007 A1 | 7/2013 | Kurashige et al. |
| 2017/0334341 A1 | 11/2017 | Kurashige et al. |

FOREIGN PATENT DOCUMENTS

| | | |
|---|---|---|
| JP | 2009-169012 A1 | 7/2009 |
| JP | 2012-146621 A1 | 8/2012 |
| JP | 2014-098754 A1 | 5/2014 |
| WO | 2012033174 A1 | 3/2012 |
| WO | 2014121315 A1 | 8/2014 |
| WO | 2015087934 A1 | 6/2015 |

OTHER PUBLICATIONS

International Search Report and Written Opinion (Application No. PCT/JP2016/068427) dated Sep. 20, 2016.
Extended European Search Report, European Application No. 16814364.2, dated Nov. 12, 2018 (8 pages).
Chinese Office Action (with English translation), Chinese Application No. 201680035856.X, dated Jul. 17, 2019 (14 pages).
Japanese Office Action (with English translation), Japanese Application No. 2017-176938, dated Jan. 31, 2020.
Chinese Office Action (with English translation), Chinese Application No. 201680035856.X, dated Mar. 12, 2020 (13 pages).

ILLUMINATION DEVICE

BACKGROUND OF THE INVENTION

1. Field of the Invention

The present invention relates to an illumination device that illuminates a prescribed range by using coherent light.

2. Description of Related Art

Illumination devices employing a laser light source are becoming prevalent since the laser light source is long-life compared to high-pressure mercury lamps and the like, the optical system can be downsized, and the electric power consumption is lower.

For example, Patent Document 1 discloses a vehicle light fixture capable of using a laser oscillation device as the light source. This vehicle light fixture includes a hologram element. A hologram pattern computed so that diffracted light reproduced by irradiating the hologram pattern with a reference beam will form a light distribution pattern having a prescribed luminosity distribution is recorded in the hologram element.

CITATION LIST

Patent Literature

Patent Document 1: Japanese patent application publication No. 2012-146621

SUMMARY OF THE INVENTION

Technical Problem

By using an optical element such as a hologram element in combination with a laser light source as above, a laser beam can be applied efficiently to a relatively large intended region. For example, in order to illuminate the whole of an illumination range at uniform brightness by using such an illumination device, it is sufficient if the laser beam emitted from the laser light source is applied uniformly to the entire optical element and the laser beam is made to exit from the optical element uniformly towards the entire illumination range.

On the other hand, there are also cases where it is required to illuminate a partial range in the illumination range at higher or lower brightness than the other ranges without uniformly illuminating the whole of the illumination range. In such cases, it is possible to employ a method like adjusting the intensity of the laser beam irradiating the optical element by controlling the output power of the laser beam emitted from the laser light source so that the laser beam exiting from the optical element towards the partial range in the illumination range is brighter or darker than the laser beam exiting from the optical element towards the other ranges.

However, in order to adjust the partial range in the illumination range to higher or lower brightness by controlling the laser beam output power of the laser light source, extremely fine and delicate output power control is required. Especially in cases where the illumination range is changed continuously by scanning the laser beam on the optical element to continuously change the laser beam irradiation position on the optical element, the output power control of the laser beam has to be carried out according to the scan of the laser beam, and thus the processing configuration is necessitated to be complicated.

The object of the present invention, which has been made in consideration of the above-described situation, is to provide an illumination device capable of illuminating a partial range in the illumination range at higher or lower brightness than the other ranges without the need of a complicated processing configuration.

Solution to Problem

A mode of the present invention relates to an illumination device including a coherent light source that emits a coherent beam, an optical element having a plurality of diffusion subelements each of which guides the coherent beam incident thereon, such that the coherent beam illuminates a corresponding illumination object subregion, and an optical scan unit that guides the coherent beam emitted from the coherent light source and thereby scans the coherent beam on the plurality of diffusion subelements. The plurality of diffusion subelements include diffusion subelements differing in size.

Preferably, size of an incidence region for the coherent beam in each of the plurality of diffusion subelements is determined according to a light flux amount required in the corresponding illumination object subregion.

Preferably, the incidence region for the coherent beam in each of the plurality of diffusion subelements is larger with the increase in the light flux amount required in the corresponding illumination object subregion.

Preferably, output power of the coherent beam emitted from the coherent light source is constant.

Preferably, the optical scan unit scans the coherent beam on the plurality of diffusion subelements at a constant speed.

Preferably, the optical scan unit includes a rotating body for guiding the coherent beam and scans the coherent beam on the plurality of diffusion subelements at the constant speed by maintaining an angular speed of the rotating body at a constant speed.

Preferably, the illumination device further includes an optical scan control unit that controls a light irradiation position of the coherent beam on the plurality of diffusion subelements by controlling the optical scan unit.

Preferably, the illumination device further includes a light emission control unit that controls the emission of the coherent beam from the coherent light source.

Preferably, the light emission control unit controls the emission of the coherent beam from the coherent light source according to a light irradiation position of the coherent beam on the plurality of diffusion subelements.

Preferably, the light emission control unit selectively irradiates the plurality of diffusion subelements with the coherent beam by controlling the emission of the coherent beam from the coherent light source according to the light irradiation position on the plurality of diffusion subelements.

Preferably, the plurality of diffusion subelements differ from each other in a light distribution direction and the illumination object subregions different from each other are illuminated.

Preferably, the optical element is a hologram record medium, and the plurality of diffusion subelements are hologram subelements having interference fringe patterns different from each other.

Preferably, each of the plurality of diffusion subelements is a lens array including a plurality of lenses, and the optical element is a lens array set including a plurality of lens arrays.

Advantageous Effect of Invention

According to the present invention, the brightness of the illumination range is adjusted according to the sizes of the incidence regions of the plurality of light diffusion subelements.

Therefore, a partial range in the illumination range can be illuminated at higher or lower brightness than the other ranges without the need of a complicated processing configuration.

DETAILED DESCRIPTION OF THE INVENTION

Embodiments of the present invention will be described below with reference to drawings. In the accompanying drawings of the description, the reduction scale, the aspect ratio between horizontal and vertical dimensions, etc. are properly exaggerated or modified from those of the actual object for convenience of illustration and easy understanding.

Further, terms used in the description for specifying a shape, geometric condition or the degree of the shape or geometric condition, such as "parallel," "orthogonal," "same," "equivalent" and "constant," and values of length, angle, etc. in the description are not to be limited to their strict senses but to be interpreted to include a range within which an equivalent function can be expected.

First Embodiment

Figure 1:
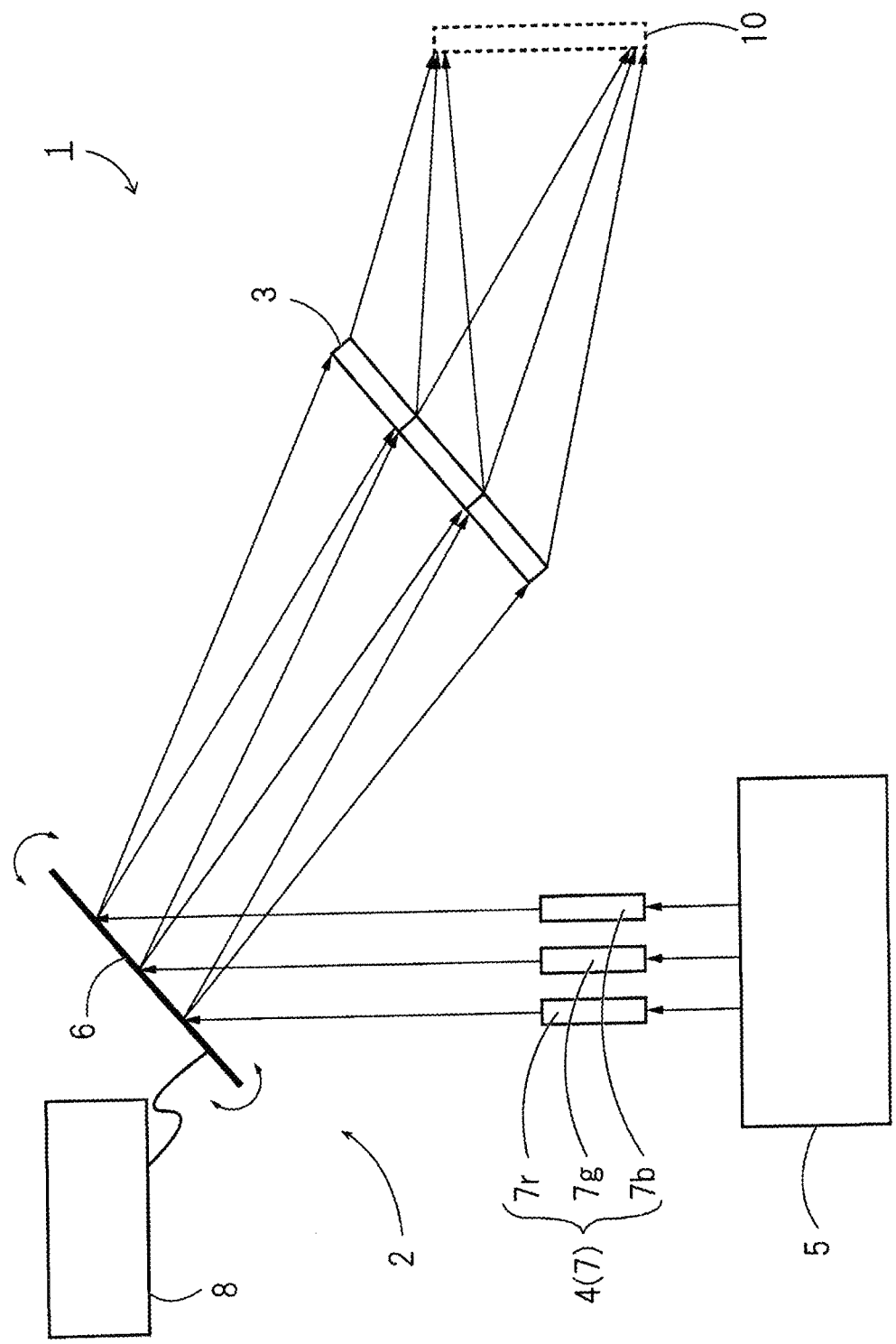
FIG. 1 is a diagram showing the general configuration of an illumination device according to a first embodiment of the present invention.

FIG. 1 is a diagram showing the general configuration of an illumination device 1 according to a first embodiment of the present invention. The illumination device 1 of FIG. 1 includes an irradiation device 2 and an optical element 3. The irradiation device 2 includes a laser light source 4 functioning as a coherent light source, a light emission control unit 5, an optical scan unit 6, and an optical scan control unit 8.

The laser light source 4 includes a plurality of light source units 7 that emit laser beams as a plurality of coherent beams differing from each other in the emission wavelength range. These light source units 7 may either be provided independently of each other or provided as a light source module formed by arranging a plurality of light source units 7 on a common substrate. As for the laser light source 4 in the embodiment, it is sufficient if the laser light source 4 includes at least two light source units 7 differing from each other in the emission wavelength range and if there are two or more types of emission wavelength ranges. It is also possible to provide two or more light source units 7 for each emission wavelength range in order to increase the emission intensity.

In the example shown in FIG. 1, the laser light source 4 includes a light source unit 7r having a red emission wavelength range, a light source unit 7g having a green emission wavelength range, and a light source unit 7b having a blue emission wavelength range. Thus, it is also possible to generate white illuminating light by superimposing together the three types of laser beams emitted by these light source units 7r, 7g and 7b.

The light emission control unit 5 controls the laser light source 4 and thereby controls the emission of the coherent beams from the laser light source 4. The light emission control unit 5 controls the emission timing of the plurality of laser beams differing from each other in the emission wavelength range independently of each other in synchronizing with the timing of the scanning of the laser beams by the optical scan unit 6. Specifically, in cases where a plurality of light source units 7 are provided corresponding to a plurality of laser beams differing from each other in the emission wavelength range, the light emission control unit 5 controls the emission timing, for making the light source units 7 emit laser beams, in regard to each light source unit 7. In cases where the laser light source 4 is capable of emitting three laser beams of red, green and blue as mentioned above, controlling the emission timing of each laser beam makes it possible to generate illuminating light of an intended color selected from red, green and blue, or illuminating light of a color as a mixture of two or more intended colors selected from red, green and blue.

The light emission control unit 5 may either control whether or not to make each light source unit 7 emit the laser beam, that is, control the ON/OFF of the light emission, or make switching between guiding the laser beam emitted from each light source unit 7 to an incidence surface of the optical scan unit 6 and not guiding the laser beam to the incidence surface. In the latter case, it is possible to provide an unshown optical shutter unit between each light source unit 7 and the optical scan unit 6 and make the optical shutter unit switch between the transmission and the interruption of the laser beam. The light emission control unit 5 may also be configured to control the laser beam emission intensity of each light source unit 7 and thereby cause each light source unit 7 to emit a laser beam of high emission intensity or a laser beam of low emission intensity.

The optical scan unit 6 changes the traveling direction of the laser beam from the laser light source 4 with time so that the laser beam's traveling direction does not remain constant. Specifically, the optical scan control unit 8 controls the optical scan unit 6 and thereby controls a light irradiation position of the laser beam on the optical element 3. Consequently, the laser beam exiting from the optical scan unit 6 scans an incidence surface of the optical element 3. As above, the optical scan unit 6 guides the laser beam emitted from the laser light source 4 and thereby scans the laser beam on the optical element 3.

Figure 2:
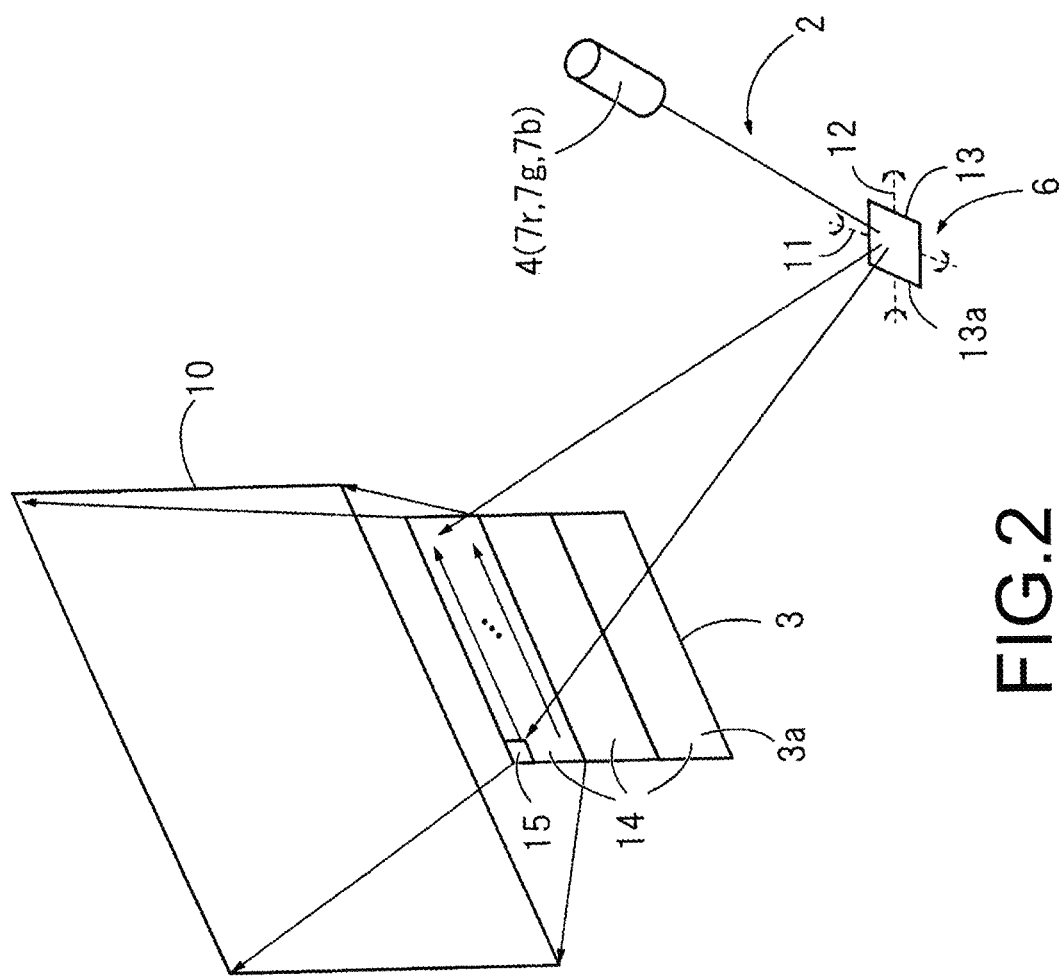
FIG. 2 is a diagram for explaining a laser beam scan performed by an optical scan unit.

FIG. 2 is a diagram for explaining the laser beam scan by the optical scan unit 6. The optical scan unit 6 includes a reflector device 13 capable of rotating around two rotation axes 11 and 12 extending in directions crossing each other as shown in FIG. 2, for example. The laser beam from the laser light source 4 incidents on a reflecting surface 13a of the reflector device 13 is reflected at an angle corresponding to an inclination angle of the reflecting surface 13a and then travels towards the incidence surface 3a of the optical element 3. Thus, rotating the reflector device 13 around the two rotation axes 11 and 12 causes the laser beam to two-dimensionally scan the incidence surface 3a of the optical element 3. Since the reflector device 13 repeats the operation of rotating around the two rotation axes 11 and 12 at a constant cycle, for example, the laser beam repeats the two-dimensional scan on the incidence surface 3a of the optical element 3 in synchronizing with the cycle.

In the embodiment, it is assumed that only one optical scan unit 6 is provided, and every one of the laser beams emitted from the laser light source 4 is incident on the common optical scan unit 6, undergoes the change of the traveling direction with time by the optical scan unit 6, and scans the optical element 3. It is also possible to provide a plurality of optical scan units 6. For example, it is possible to provide as many optical scan units 6 as the light source units 7 and make the laser beams from the light source units 7 scan the optical element 3 by having the laser beam from each light source unit 7 guided by the corresponding optical scan unit 6.

The optical element 3 has the incidence surface 3a on which the laser beams from the laser light source 4 constituting the light source unit 7 are incident via the optical scan unit 6. The optical element 3 diffuses the laser beams incident on the incidence surface 3a such that the laser beams illuminate a prescribed range. More specifically, a plurality of laser beams diffused by the optical element 3 pass through an illumination object region 10 and thereafter illuminate the prescribed range as the actual illumination range.

The illumination object region 10 corresponds to a near-field illumination range that is illuminated by diffusion regions 14 in the optical element 3 in a superimposing manner. A far-field illumination range is often expressed as a diffusion angle distribution in the angular space rather than being expressed by dimensions in the actual illumination object region. The term "illumination object region" in the description is intended to include a diffusion angle range in the angular space in addition to the actual illumination object area or illumination range. Thus, the prescribed range illuminated by the illumination device of FIG. 1 can be a region far larger than the near-field illumination object region 10 shown in FIG. 1.

Figure 3:
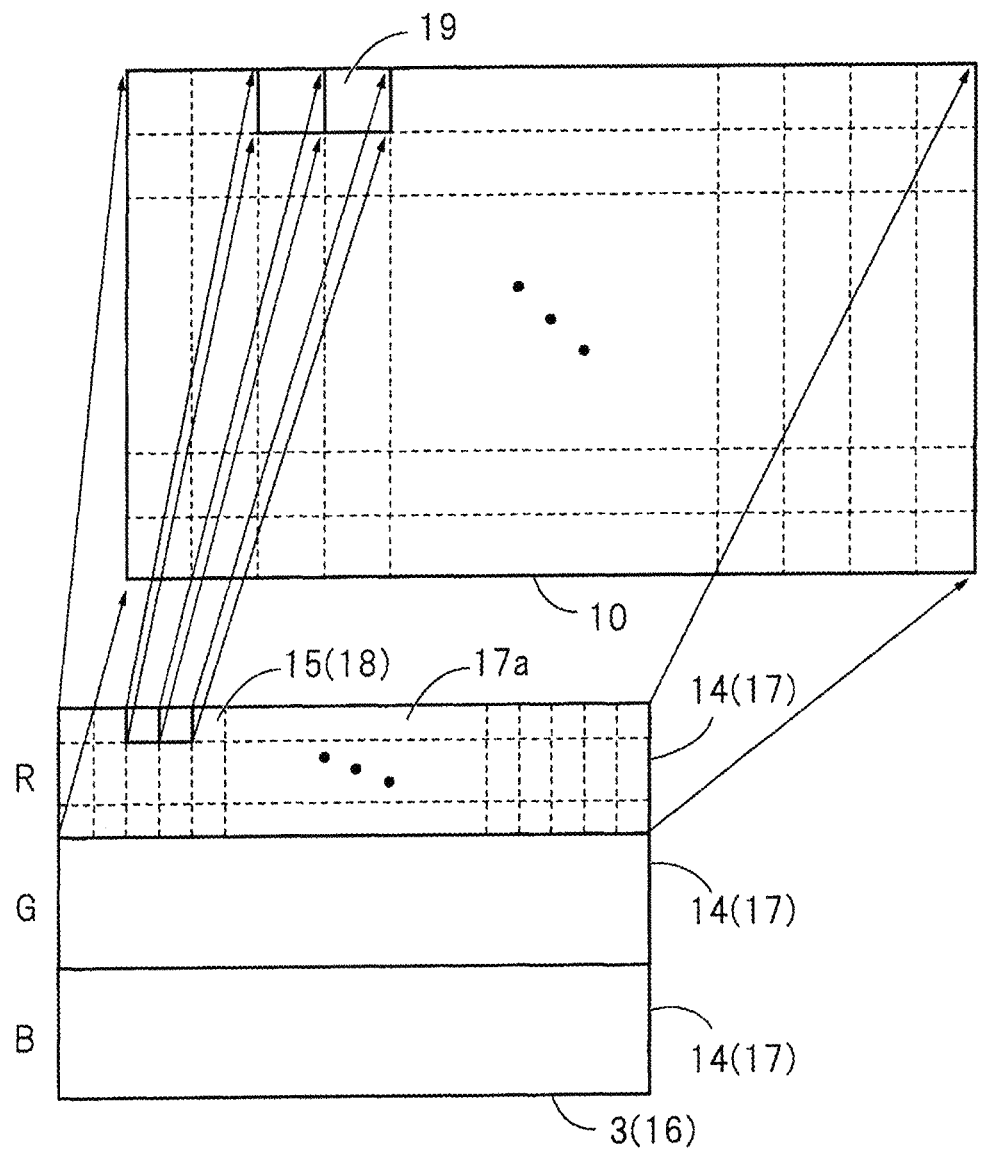
FIG. 3 is a diagram showing a state in which a laser beam diffused by an optical element is incident on an illumination object region.

FIG. 3 is a diagram showing a state in which a laser beam diffused by the optical element 3 is incident on the illumination object region 10. The optical element 3 has a plurality of diffusion regions 14. Each diffusion region 14 corresponds to one of the multiple types of laser beams emitted from the laser light source 4. Each diffusion region 14 receives the corresponding laser beam incident thereon. Thus, the optical element 3 has a diffusion region 14 on which the red (R) laser beam is incident, a diffusion region 14 on which the green (G) laser beam is incident, and a diffusion region 14 on which the blue (B) laser beam is incident. The diffusion regions 14 diffuse the incident laser beams such that the laser beam illuminates the entire illumination object region 10 as a whole. Each diffusion region 14 includes a plurality of diffusion subelements 15. The plurality of diffusion subelements 15 differ from each other in a light distribution direction, for illumination object subregions different from each other being illuminated. Namely, each of the diffusion subelements 15 guides the incident laser beam while diffusing the laser beam such that the laser beam illuminates a corresponding subregion of the illumination object region 10, that is, a corresponding illumination object subregion 19. The illumination object region 10 is divided into a plurality of illumination object subregions 19. Each illumination object subregion 19 is illuminated by the laser beam from the corresponding diffusion subelement 15.

The optical element 3 is formed with a hologram record medium 16. The hologram record medium 16 has a plurality of hologram regions 17 functioning as the aforementioned "plurality of diffusion regions 14." Each hologram region 17 is provided corresponding to one of the laser beams differing from each other in the wavelength range. Each hologram region 17 has an incidence surface 17a on which the corresponding laser beam is incident. The laser beam incident on the incidence surface 17a of each hologram region 17 and diffused illuminates the illumination object region 10. Thus, in cases where the hologram record medium 16 has three hologram regions 17 corresponding to the respective RGB laser beams, for example, each of the RGB laser beams diffused by the corresponding hologram region 17 illuminates the entire illumination object region 10. Accordingly, in cases where the R laser beam, the G laser beam and the B laser beam are emitted from the laser light source 4, the illumination object region 10 is irradiated with these RGB laser beams and thereby illuminated in white.

While an example of providing three hologram regions 17 corresponding to the three laser beams emitted in the wavelength ranges of red, blue and green is shown in FIG. 3, the types of the laser beams and the number of the hologram regions 17 are not particularly limited. It is desirable to provide the hologram regions 17 corresponding to the types of the laser beams emitted from the laser light source 4. When the number of types of laser beams emitted from the laser light source 4 is two or more, the number of hologram regions 17 of the hologram record medium 16 is also desired to be two or more.

The sizes, i.e., areas, of the hologram regions 17 in the hologram record medium 16 do not necessarily have to be the same as each other. The size of the illumination object region that can be irradiated by the laser beam may either be the same or different among the hologram regions 17. Even if the size of the illumination object region is different among the hologram regions 17, the hologram regions 17 are capable of causing a common illumination object region 10 to be illuminated if interference fringes formed on the incidence surface 17a of each hologram region 17 are adjusted in regard to each hologram region 17.

Each of the hologram regions 17 includes a plurality of hologram subregions 18 functioning as the aforementioned "plurality of diffusion subelements 15." Each of the hologram subregions 18 diffuses the incident laser beam such that the laser beam illuminates an illumination object subregion 19 as a subregion in the illumination object region 10. At least part of the illumination object subregions 19 illuminated by using hologram subregions 18 differ among the hologram subregions 18. Illumination object subregions 19 illuminated by using different hologram subregions 18 at least partially differ from each other.

Interference fringe patterns different from each other are respectively formed on the incidence surfaces 17a of the hologram subregions 18. The laser beam incident on the incidence surface 17a of each hologram subregion 18 is diffracted according to the interference fringe pattern on the incidence surface 17a and then illuminates a corresponding illumination object subregion 19 in the illumination object region 10. Thus, by adjusting the interference fringe pattern formed on the incidence surface 17a of each hologram subregion 18, it is possible to change the traveling direction of the laser beam diffracted and diffused by each hologram subregion 18 to an intended direction and have the laser beam illuminate an intended illumination object subregion 19.

Incidentally, the hologram record medium 16 can be produced by using scattered light from an actual scattering plate as an object beam, for example. More specifically, when a hologram photosensitive material as the parent body of the hologram record medium 16 is irradiated with a reference beam and an object beam that are made of coherent beams having coherence with each other, interference fringes caused by the interference between the reference beam and the object beam are formed in the hologram photosensitive material, by which the hologram record medium 16 is produced. As the reference beam, a laser beam as a coherent beam is used. As the object beam, scattered light from an isotropic scattering plate available at a low price is used, for example.

By applying a laser beam towards the hologram record medium 16 so that the laser beam travels in the opposite direction in the optical path of the reference beam used for the production of the hologram record medium 16, a reconstructed image of the scattering plate is generated at the arrangement position of the scattering plate as the source of the object beam used for the production of the hologram record medium 16. If the scattering plate as the source of the object beam used for the production of the hologram record medium 16 is a plate causing uniform plane scattering, the reconstructed image of the scattering plate obtained by use of the hologram record medium 16 is also uniform plane illumination, and the region where the reconstructed image of the scattering plate is generated serves as the illumination object region 10.

The complicated interference fringe pattern formed in each hologram subregion 18 can be designed by using a computer based on the wavelength and the incidence direction of the illuminating light planned to be used for the reconstruction and the shape, position, etc. of the image to be reconstructed, instead of forming the interference fringe pattern by using the actual object beam and the reference beam. The hologram record medium obtained as above is referred to also as a computer generated hologram (CGH). It is also possible to form a Fourier transformation hologram, in which diffusion angle characteristics at each point on each hologram subregion 18 are the same, by means of the computer generation. Further, it is also possible to set the size and the position of the actual illumination range by providing an optical member such as a lens at a position on an optical axis rear side of the illumination object region 10.

As a specific configuration of the hologram record medium 16, it is possible to employ a volume-type hologram record medium 16 using photopolymer, a volume-type hologram record medium 16 of the type recording the hologram by using a photosensitive medium containing a silver halide material, or a hologram record medium 16 of the relief type.

One of the advantages in providing the hologram record medium 16 as the optical element 3 is that the light energy density of the laser beam can be lowered by means of diffusion. One of the other advantages of the hologram record medium 16 is that the luminance on the light source plane necessary for achieving the same illuminance distribution can be lowered in comparison with a lamp light source functioning as the conventional point light source since the hologram record medium 16 becomes usable as a directional surface light source. This contributes to safety improvement of laser beams, and the danger of causing ill effects on human eyes looking straight at the laser beam after passing through the illumination object region 10 is reduced in comparison with cases of looking straight at a single point light source.

As above, the laser beam from the laser light source 4 incidents on the hologram record medium 16 via the optical scan unit 6 is guided by each hologram subregion 18 and then illuminates a corresponding illumination object subregion 19. Further, the optical scan unit 6 changes the incidence position and the incidence angle of the laser beam at the hologram subregion 18 of the hologram record medium 16 with time. The laser beam incident on one hologram subregion 18 illuminates a common illumination object subregion 19 irrespective of its incidence position in the hologram subregion 18, while the incidence angle of the laser beam incident on each point in the illumination object subregion 19 changes with time. The change in the incidence angle is too fast for human eyes to resolve. Consequently, scatter patterns of coherent beams having no correlation with each other are multiplexed together and observed by human eyes. Thus, each illumination object subregion 19 of the illumination object region 10, in a state in which speckles generated corresponding to scatter patterns have been superimposed on each other and averaged, is observed by the observer. Accordingly, the speckles can be made less noticeable.

While laser beams passing through different hologram subregions 18 illuminate different illumination object subregions 19 in the illumination object region 10, at least parts of the illumination object subregions 19 illuminated by the laser beams passing through different hologram subregions 18 may overlap with each other. Further, the sizes of the illumination object subregions 19 constituting the illumination object region 10 may either be the same or different from each other. Furthermore, the illumination object subregions 19 corresponding to the hologram subregions 18 do not need to be arranged in the illumination object region 10 in the order of arrangement of the hologram subregions 18. In other words, the order of arrangement of the hologram subregions 18 in the hologram region 17 and the order of arrangement of the corresponding illumination object subregions 19 in the illumination object region 10 do not necessarily have to coincide with each other.

Figure 4:
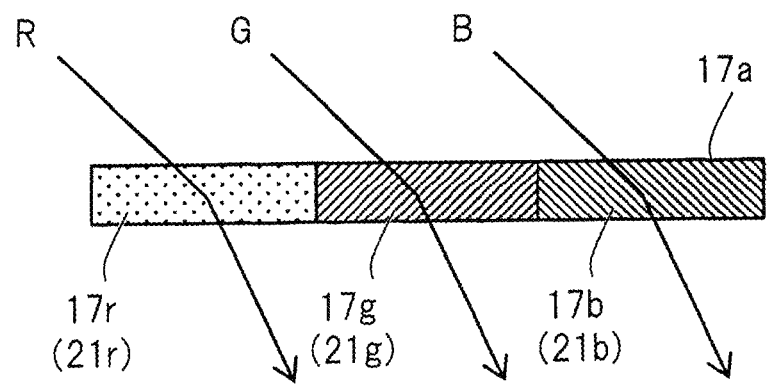
FIG. 4 is a cross-sectional view showing an example of hologram regions.
Figure 5:
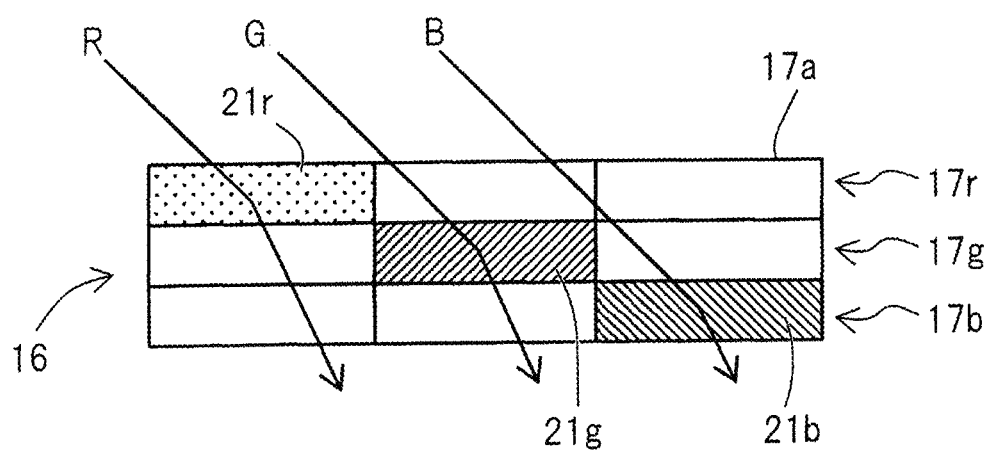
FIG. 5 is a cross-sectional view showing another example of hologram regions.

FIG. 4 is a cross-sectional view showing an example of the hologram regions 17. FIG. 5 is a cross-sectional view showing another example of the hologram regions 17. The specific arrangement and configuration of the hologram regions 17 are not particularly limited. For example, hologram regions 17r, 17g and 17b provided corresponding to multiple types of laser beams are typically arranged adjacently as shown in FIG. 4, the incidence surfaces 17a of the hologram regions 17r, 17g and 17b are arranged on the same plane, and specific interference fringe patterns 21r, 21g and 21b are also formed in the same layer. However, the hologram regions 17r, 17g and 17b and the interference fringe patterns 21r, 21g and 21b do not necessarily have to be formed adjacently and in the same layer; it is also possible to employ a hologram record medium 16 in which the hologram regions 17r, 17g and 17b are arranged in a stacking direction (see FIG. 5). In this case, the interference fringe patterns 21r, 21g and 21b are formed like layers respectively in the corresponding hologram regions 17r, 17g and 17b. In this case, it is desirable to set the visible light transmittance of each of the hologram regions 17r, 17g, and 17b as high as possible in order to allow the laser beam to reach the interference fringe pattern situated far behind the incidence surface 17a, as the front surface of the hologram record medium 16 on which the laser beam from the optical scan unit 6 is incident, with as less loss as possible. Further, forming the hologram regions 17r, 17g and 17b at positions overlapping in the stacking direction makes it difficult for the laser beam to reach the interference fringe pattern existing far behind the incidence surface 17a. Therefore, it is desirable to form the interference fringe patterns 21r, 21g and 21b at positions shifted from each other in a direction orthogonal to the stacking direction as shown in FIG. 5.

In the optical element 3 having the configuration described above, the diffusion subelements 15 include at least two types of diffusion subelements 15 differing in the size.

Figure 6:
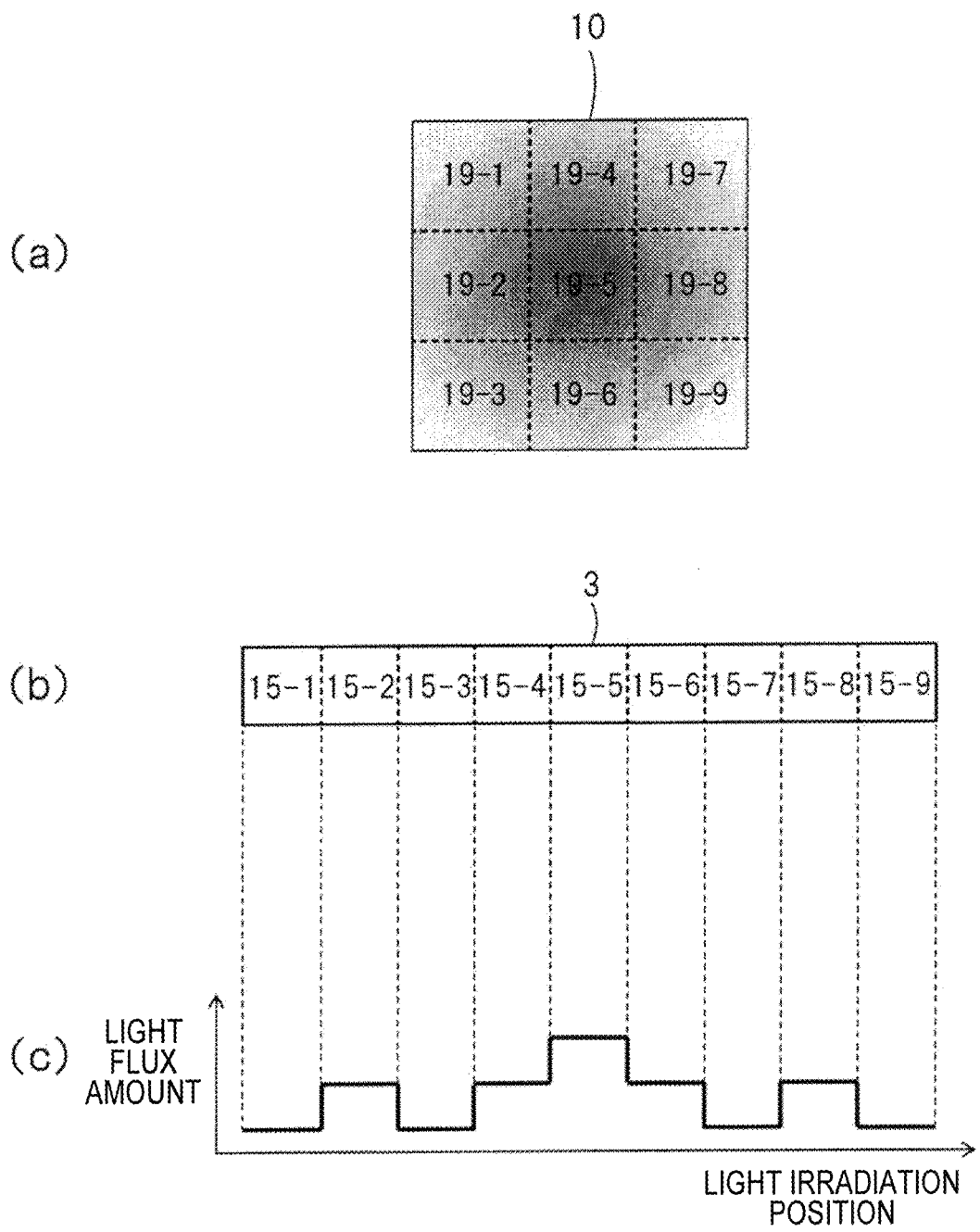
FIG. 6 is a diagram for explaining an example of upwardly or downwardly adjusting brightness of a partial range in an illumination range by controlling output power of a laser beam emitted from a laser light source, in which (a) of FIG. 6 shows an example of targeted illumination in the illumination object region, (b) of FIG. 6 shows the optical element (diffusion subelements) used for illuminating the illumination object region shown in (a) of FIG. 6, and (c) of FIG. 6 shows an example of the relationship between the light irradiation position and a light flux amount of the laser beam on the optical element (diffusion subelements).

FIG. 6 is a diagram for explaining an example of upwardly or downwardly adjusting the brightness of a partial range in the illumination range by controlling the output power of a laser beam emitted from the laser light source 4, in which (a) of FIG. 6 shows an example of targeted illumination in the illumination object region 10, (b) of FIG. 6 shows the optical element 3 used for illuminating the illumination object region 10 shown in (a) of FIG. 6, and (c) of FIG. 6 shows an example of the relationship between the light irradiation position and a light flux amount, i.e., the luminous flux (unit: lm (lumen)), of the laser beam on the optical element 3.

In (a) of FIG. 6, higher density indicates brighter illumination and lower density indicates darker illumination. Thus, the illumination object subregion 19-5 at the center is illuminated the brightest and the illumination becomes gradually darker with the increase in the distance from the central illumination object subregion 19-5. In regard to the light flux amount, the illumination object subregions 19-1 to 19-9 have the following relationship:

19-5>19-2=19-4=19-6=
19-8>19-1=19-3=19-7=
19-9                (Illumination Relationship Example)

Each of the diffusion subelements 15-1 to 15-9 constituting the optical element 3 diffuses and guides the laser beam from the optical scan unit 6 so that the corresponding one of the illumination object subregions 19-1 to 19-9 is irradiated by the laser beam as explained earlier. Especially, the optical element 3 shown in (b) of FIG. 6 is formed of diffusion subelements 15-1 to 15-9 that are equal to each other in the size of the laser beam incident region.

In order to implement the illumination mode shown in (a) of FIG. 6 with the optical element 3 (diffusion subelements 15-1 to 15-9) shown in (b) of FIG. 6 while maintaining the laser beam scan speed of the optical scan unit 6 at a constant speed, the output power of the laser beam emitted from the laser light source 4 has to be controlled to satisfy the relationship between the light irradiation position and the light flux amount shown in (c) of FIG. 6. Specifically, when illuminating an illumination object subregion 19 required to be bright in the illumination object region 10, it is necessary to increase the laser beam irradiation intensity on the corresponding diffusion subelement 15 by relatively increasing the output power of the laser beam emitted from the laser light source 4. In contrast, when illuminating an illumination object subregion 19 required to be dark in the illumination object region 10, it is necessary to decrease the laser beam irradiation intensity on the corresponding diffusion subelement 15 by relatively decreasing the output power of the laser beam emitted from the laser light source 4.

Thus, when illuminating the central illumination object subregion 19-5 required to be the brightest in the example shown in FIG. 6, the light flux amount of the laser beam irradiating the corresponding diffusion subelement 15-5 is maximized by maximizing the output power of the laser beam emitted from the laser light source 4. When illuminating one of the illumination object subregions 19-1, 19-3, 19-7 and 19-9 at the four corners required to be the darkest, the light flux amount of the laser beam irradiating the corresponding diffusion subelement 15-1, 15-3, 15-7 or 15-9 is minimized by minimizing the output power of the laser beam emitted from the laser light source 4. When illuminating one of the other illumination object subregions 19-2, 19-4, 19-6 and 19-8 required to be at intermediate brightness, the light flux amount of the laser beam irradiating the corresponding diffusion subelement 15-2, 15-4, 15-6 or 15-8 is set at an intermediate level by setting the output power of the laser beam emitted from the laser light source 4 at an intermediate level.

In cases where the illumination on the illumination object region 10 is adjusted by controlling the laser beam output power of the laser light source 4 as above, the output power of the laser beam has to be changed according to the laser beam irradiation position on the optical element 3 and thus the output power control of the laser beam is extremely complicated. Especially when the laser beam is scanned on the optical element 3, due to the small size of each diffusion subelement 15 and the fast scan speed, the output power of the laser beam has to be changed and adjusted at an extremely high speed and the processing configuration for carrying out the laser beam output power control stably and precisely is necessitated to be extremely complicated.

In contrast, in the embodiment, the size of the laser beam incidence region in each of the diffusion subelements 15 constituting the optical element 3 has been set according to the light flux amount required in the corresponding illumination object subregion 19.

Figure 7:
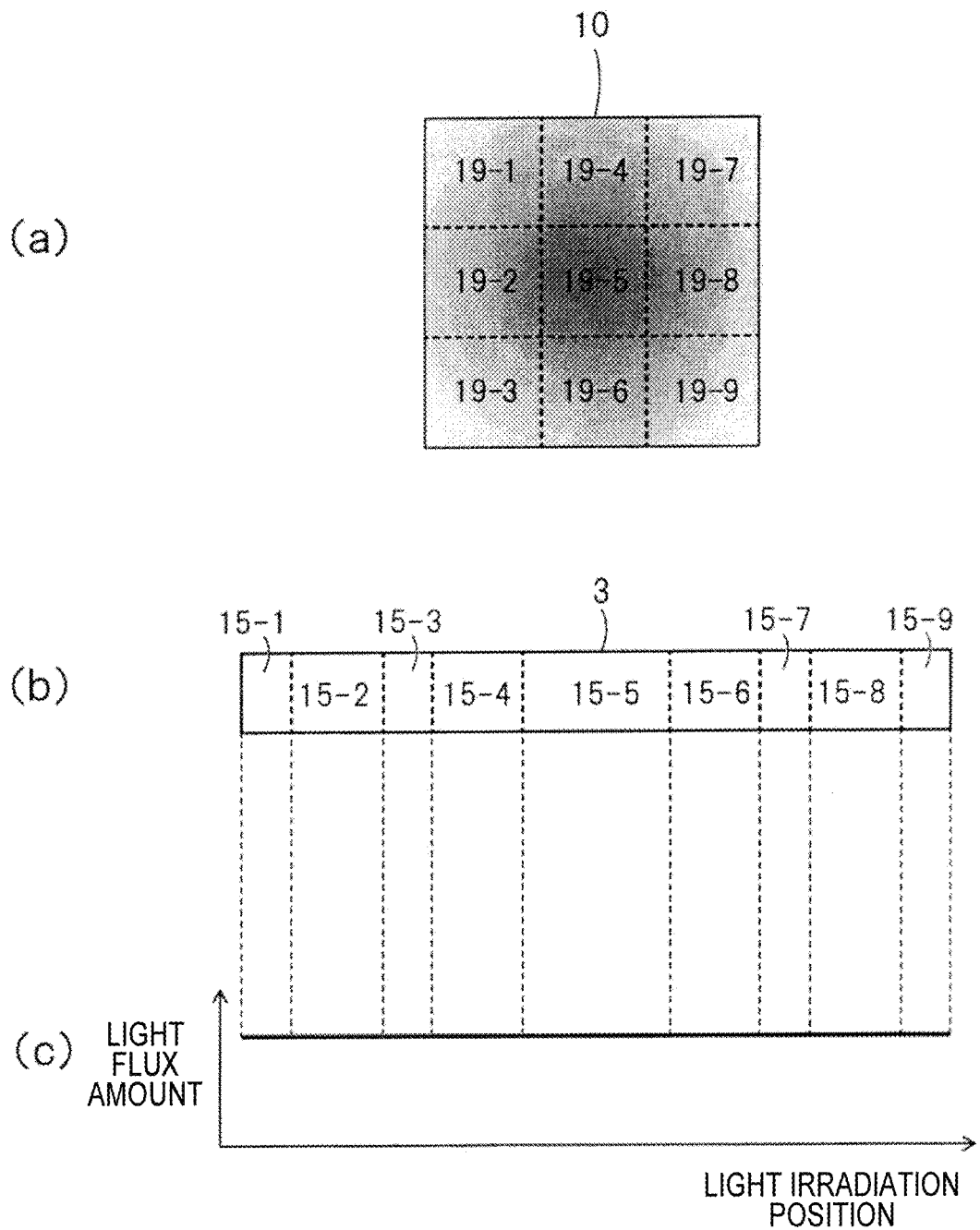
FIG. 7 is a diagram for explaining an example of upwardly or downwardly adjusting the brightness of a partial range in the illumination range by adjusting the size of an incidence region of each diffusion subelement, in which (a) of FIG. 7 shows an example of targeted illumination in the illumination object region, (b) of FIG. 7 shows the optical element (diffusion subelements) used for illuminating the illumination object region shown in (a) of FIG. 7, and (c) of FIG. 7 shows an example of the relationship between the light irradiation position and the light flux amount of the laser beam on the optical element (diffusion subelements).

FIG. 7 is a diagram for explaining an example of upwardly or downwardly adjusting the brightness of a partial range in the illumination range by adjusting the size of the incidence region of each diffusion subelement 15, in which (a) of FIG. 7 shows an example of targeted illumination in the illumination object region 10, (b) of FIG. 7 shows the optical element 3 used for illuminating the illumination object region 10 shown in (a) of FIG. 7, and (c) of FIG. 7 shows an example of the relationship between the light irradiation position and the light flux amount of the laser beam on the optical element 3.

The illumination example shown in (a) of FIG. 7 is the same as the above-described illumination example shown in (a) of FIG. 6, in which the illumination object subregion 19-5 at the center is illuminated the brightest and the illumination becomes gradually darker with the increase in the distance from the central illumination object subregion 19-5 (see the "Illumination Relationship Example" described above).

The sizes of the diffusion subelements 15 constituting the optical element 3 are not constant and the size of the laser beam incidence region in each diffusion subelement 15 has been set according to the ratio of a target light flux amount in the corresponding illumination object subregion 19. Specifically, in a diffusion subelement 15 corresponding to an illumination object subregion 19 required to be bright in the illumination object region 10, the laser beam incidence region is set to be relatively large. In contrast, in a diffusion subelement 15 corresponding to an illumination object subregion 19 required to be dark in the illumination object region 10, the laser beam incidence region is set to be relatively small. Accordingly, in each of the diffusion subelements 15, the laser beam incidence region becomes larger with the increase in the light flux amount required in the corresponding illumination object subregion 19, and the laser beam incidence region becomes smaller with the decrease in the light flux amount required in the corresponding illumination object subregion 19.

Thus, in the example shown in FIG. 7, the size of the diffusion subelement 15-5 corresponding to the central illumination object subregion 19-5 required to be the brightest is set to be the largest, and the sizes of the diffusion subelements 15-1, 15-3, 15-7 and 15-9 corresponding to the illumination object subregions 19-1, 19-3, 19-7 and 19-9 at the four corners required to be the darkest are set to be the smallest. The sizes of the diffusion subelements 15-2, 15-4, 15-6 and 15-8 corresponding to the illumination object subregions 19-2, 19-4, 19-6 and 19-8 required to be at intermediate brightness are set at an intermediate size.

By adjusting the size of each diffusion subelement 15 as the size of each laser beam incidence region as explained above, the illumination object region 10 can be illuminated in an intended mode without the need of changing the output power of the laser beam emitted from the optical element 3 or the laser beam scan speed of the optical scan unit 6.

For example, the intended illumination mode can be implemented with ease by making the ratios of "the sizes of the laser beam incidence regions" among the diffusion subelements 15 constituting the optical element 3 coincide with "the ratios of the target light flux amounts in the corresponding illumination object subregions 19" and having the optical scan unit 6 scan the laser beam on the optical element 3 at a constant speed while maintaining the output power of the laser beam emitted from the optical element 3 at a constant level.

As explained above, in order to control the laser beam output power of the optical element 3 according to the laser beam scan by the optical scan unit 6, the required processing becomes complicated and it is difficult to precisely illuminate the illumination range in the intended mode. In contrast, with the illumination device 1 according to the embodiment, by previously adjusting the sizes of the diffusion subelements 15 constituting the optical element 3, i.e., the sizes of the laser beam incidence regions, based on the target light flux amounts in the illumination object subregions 19 corresponding to the diffusion subelements 15, it is possible to precisely illuminate the illumination range in the intended mode while maintaining the output power of the laser beam emitted from the optical element 3 and the laser beam scan speed of the optical scan unit 6 at constant levels without changing them.

As described above, with the illumination device 1 according to the embodiment, a partial range in the illumination range can be precisely illuminated at higher or lower brightness than the other ranges without the need of a complicated processing configuration.

Second Embodiment

In the embodiment, components identical with those in the above-described first embodiment are assigned the same reference characters as in the first embodiment and detailed explanation thereof is omitted for brevity.

In the above first embodiment, a case where the output power of the laser beam emitted from the laser light source 4 is constant and the optical scan unit 6 scans the laser beam on the optical element 3 at a constant speed was described as an example. However, the application of the present invention is not limited to such an example. For example, the light emission control unit 5 may also be configured to control the laser beam emission of the laser light source 4 according to the light irradiation position on the diffusion subelements 15. More specifically, the light emission control unit 5 may selectively irradiate a plurality of diffusion subelements 15 with the laser beam by controlling the laser beam emission of the laser light source 4 according to the light irradiation position on the diffusion subelements 15.

Figure 8:
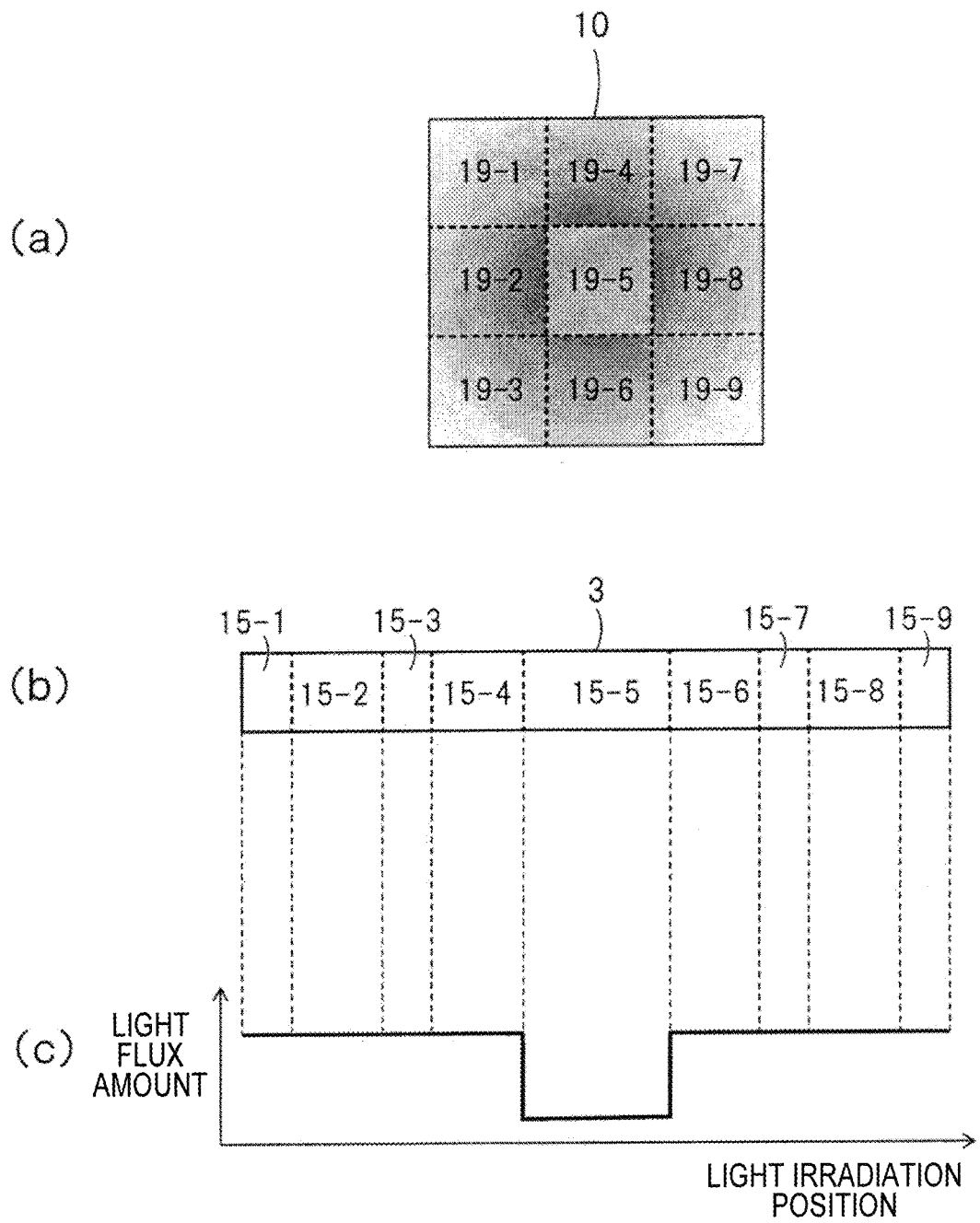
FIG. 8 is a diagram for explaining an example of upwardly or downwardly adjusting the brightness of a partial range in the illumination range with an illumination device according to a second embodiment of the present invention, in which (a) of FIG. 8 shows an example of targeted illumination in the illumination object region, (b) of FIG. 8 shows the optical element (diffusion subelements) used for illuminating the illumination object region shown in (a) of FIG. 8, and (c) of FIG. 8 shows an example of the relationship between the light irradiation position and the light flux amount of the laser beam on the optical element (diffusion subelements).

FIG. 8 is a diagram for explaining an example of upwardly or downwardly adjusting the brightness of a partial range in the illumination range with an illumination device 1 according to a second embodiment of the present invention, in which (a) of FIG. 8 shows an example of targeted illumination in the illumination object region 10, (b) of FIG. 8 shows the optical element 3 used for illuminating the illumination object region 10 shown in (a) of FIG. 8, and (c) of FIG. 8 shows an example of the relationship between the light irradiation position and the light flux amount of the laser beam on the optical element 3.

The optical element 3 shown in (b) of FIG. 8 has the same "sizes of the laser beam incidence regions" as the above-described optical element 3 (diffusion subelements 15) shown in (b) of FIG. 7, and the diffusion subelements 15 constituting the optical element 3 include at least two types of diffusion subelements 15 differing in the size of the laser beam incidence region.

The laser beam emission of the laser light source 4 is controlled according to the light irradiation position on the diffusion subelements 15 so as to satisfy the relationship between the light irradiation position and the light flux amount shown in (c) of FIG. 8. Specifically, the laser beam emission power of the laser light source 4 is controlled so that the output power of the laser beam irradiating the diffusion subelement 15-5 corresponding to the central illumination object subregion 19-5 in the illumination object region 10 is set lower than the output power of the laser beam irradiating the other diffusion subelements 15-1 to 15-4 and 15-6 to 15-9. With such control, it is possible to darken the illumination only in the central illumination object subregion 19-5 in the illumination object region 10 as shown in (a) of FIG. 8. This control is suitable in cases where a person existing in the central illumination object subregion 19-5 in the illumination object region 10 should be prevented from being dazzled by excessive irradiation with the laser beam from the illumination device 1, for example.

While only a particular illumination object subregion 19 is illuminated at lower brightness than the other illumination object subregions 19 in the example shown in FIG. 8, it is also possible to carry out the illumination so as to illuminate only a particular illumination object subregion 19 at higher brightness than the other illumination object subregions 19. The light emission control unit 5 is capable of illuminating the particular illumination object subregion 19 at higher brightness than the other illumination object subregions 19 by controlling the laser beam output power of the laser light source 4 so as to set the output power of the laser beam irradiating the diffusion subelement 15 corresponding to the particular illumination object subregion 19 higher than the output power of the laser beam irradiating the other diffusion subelements 15. This control is suitable in cases where it is desirable to make a person existing in a particular illumination object subregion 19 stand out by illuminating the person at higher brightness than the other illumination object subregions 19, for example.

As described above, with the illumination device 1 according to the embodiment, a complicated illumination mode of "selectively illuminating a particular illumination object subregion 19 at higher or lower brightness than the other illumination object subregions 19" can be implemented with ease by relatively simple output power control of the laser beam.

Application Example

Figure 9:
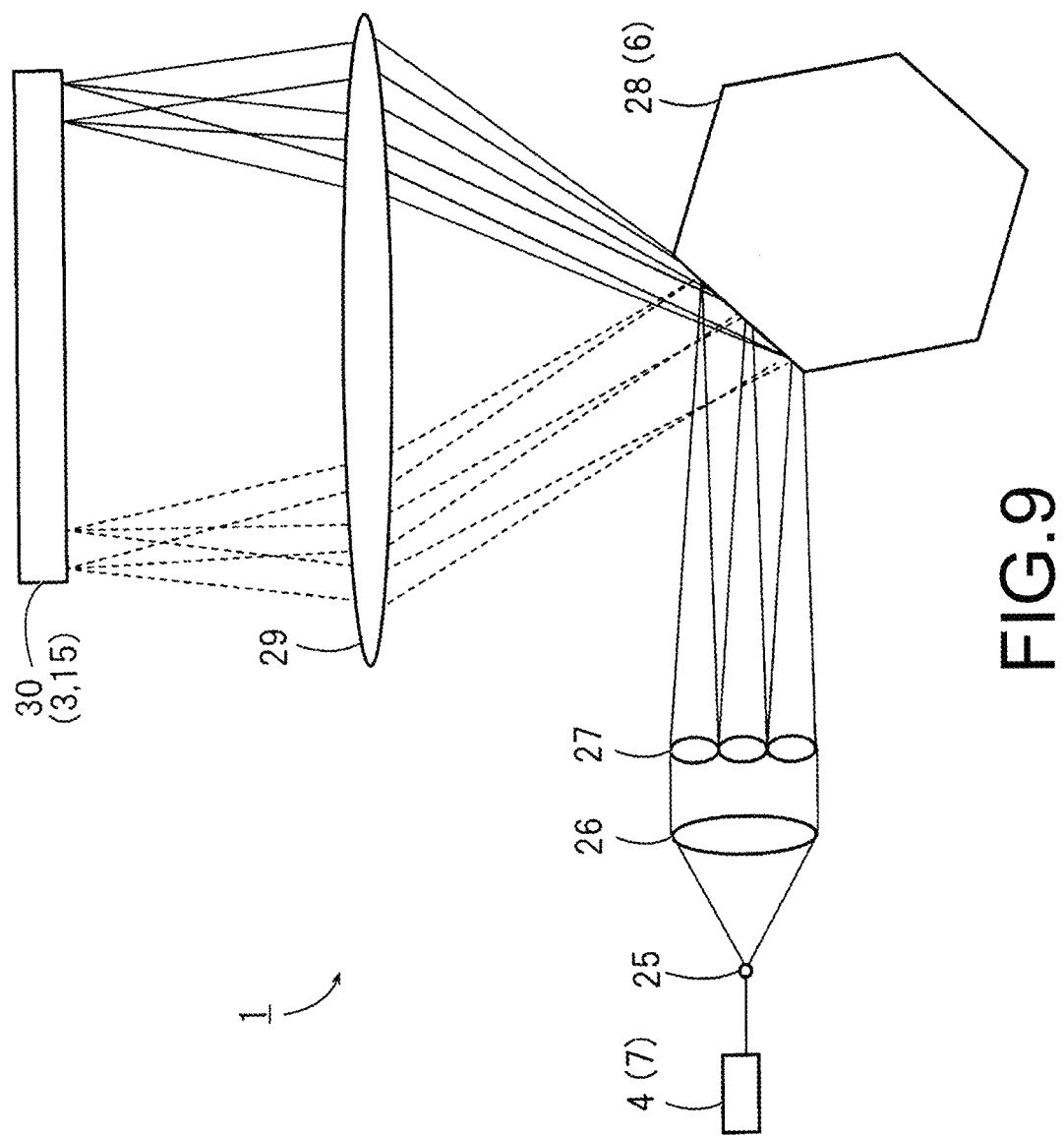
FIG. 9 is a schematic diagram showing an application example of the illumination device.

FIG. 9 is a schematic diagram showing an application example of the illumination device 1. The illumination device 1 includes a beam expander 25, a first condensing lens 26, a lens array 27, and a second condensing lens 29 in addition to the aforementioned laser light source 4, a polygon mirror 28 functioning as the optical scan unit 6, and a light diffusion element 30 functioning as the optical element 3. Although illustration is omitted, the light emission control unit 5 and the optical scan control unit 8 are also provided as in the illumination device 1 shown in FIG. 1.

The laser beam emitted from the laser light source 4 is enlarged in diameter by the beam expander 25, adjusted by the first condensing lens 26 into a collimated beam, and adjusted by the lens array 27 in terms of the light distribution angle and the diffusion angle. While the beam expander 25, the first condensing lens 26 and the lens array 27 functioning as beam shaping elements are arranged between the laser light source 4 and the polygon mirror 28 in the example shown in FIG. 9, the arrangement is not limited to this example; the beam expander 25, the first condensing lens 26 and the lens array 27 may also be arranged between the polygon mirror 28 and the second condensing lens 29, for example.

The laser beam whose light distribution angle has been adjusted by the lens array 27 and whose scan position has been controlled by the polygon mirror 28 is incident on the second condensing lens 29. The second condensing lens 29 condenses the laser beam and projects the condensed laser beam onto the light diffusion element 30. Although illustration is omitted in FIG. 9, the light diffusion element 30 also includes at least two types of diffusion subelements 15 differing in the size of the laser beam incidence region (see the reference characters 15-1 to 15-9 in (b) of FIG. 7), by which a partial range in the illumination range can be illuminated at higher or lower brightness than the other ranges easily and precisely without the need of a complicated processing configuration.

Incidentally, the optical scan unit 6 includes the polygon mirror 28 configured as a rotating body, and the laser beam is guided to an intended position by the rotating polygon mirror 28. Thus, in order to scan the laser beam on the diffusion subelements 15 at a constant speed, it is only necessary to maintain the rotational angular speed of the polygon mirror 28 at a constant speed. Accordingly, the laser beam can be scanned on the diffusion subelements 15 at a constant speed with extreme ease.

<Modification>

While an example in which each laser beam from the optical scan unit 6 passes through the optical element 3 and is diffused by the optical element 3 was shown in FIG. 1, the optical element 3 may also be an optical element that causes diffuse reflection of the laser beam. For example, in cases where the hologram record medium 16 is used as the optical element 3, the hologram record medium 16 may either be of the reflective type or the transmissive type. In general, a hologram record medium 16 of the reflective type (hereinafter referred to as a "reflective holo") has high selectivity of wavelength compared to a hologram record medium 16 of the transmissive type (hereinafter referred to as a "transmissive holo"). Namely, even in cases where interference fringes corresponding to different wavelengths are stacked up, the reflective holo is capable of diffracting a coherent beam of an intended wavelength by using an intended layer alone. The reflective holo excels also in that the influence of the 0th order beam can be eliminated with ease. In contrast, the transmissive holo has a wide diffractable spectral range and a wide tolerance range for the laser light source 4. However, in cases where interference fringe patterns corresponding to different wavelengths are stacked up, the coherent beam of the intended wavelength is diffracted also by a layer other than the intended layer. Therefore, the transmissive holo generally has difficulty in the implementation in the stacked structure.

The specific configuration of the optical element 3 is not limited to the hologram record medium 16; the optical element 3 can also be implemented by various types of diffusion members that can be finely divided into a plurality of diffusion subelements 15. For example, each of the diffusion subelements 15 can be a lens array including a plurality of lenses, and the optical element 3 can be a lens array set including a plurality of lens arrays. In this case, a lens array is provided for each diffusion subelement 15, and the shape of each lens of the lens array is designed such that an illumination object subregion 19 in the illumination object region 10 is illuminated. Also in this case, the lens arrays functioning as the diffusion subelements 15 include at least two types of lens arrays differing in the size of the incidence region for the laser beam serving as the coherent beam in the same way as in the above-described embodiments. With such a configuration, a partial range in the illumination range can be precisely illuminated at higher or lower brightness than the other ranges without the need of a complicated processing configuration.

The number of light source units 7 included in the laser light source 4 is not particularly limited and can either be one or two or more. The number of types of laser beams emitted from the light source unit(s) 7 of the laser light source 4 is also not particularly limited and can either be one or two or more. Thus, the laser light source 4 may include a plurality of light source units 7 emitting laser beams of the same wavelength range, for example. In this case, the illumination intensity in the illumination object region 10 can be increased and decreased with ease by having the light emission control unit 5 control the number of light source units 7 emitting the laser beams.

Incidentally, the objects of application of the illumination device 1 described above are not particularly limited. For example, the illumination device 1 can be mounted on a vehicle, an aircraft such as an airplane, a means of transportation such as a train, marine vessel or submarine, or a different type of moving object, or can be installed in a specified place.

Modes of the present invention are not limited to the individual embodiments described above but contain a variety of modifications conceivable by those skilled in the art, and effects of the present invention are also not limited to those described above. Namely, various additions, changes and partial deletions are possible within the range not departing from the conceptual idea and content of the present invention derived from the contents specified in the claims and equivalents thereof.

REFERENCE SIGNS LIST

1: Illumination device
2: Irradiation device
3: Optical element
4: Laser light source
5: Light emission control unit
6: Optical scan unit
7: Light source unit
8: Optical scan control unit
10: Illumination object region
11: Rotation axis
12: Rotation axis
13: Reflector device
14: Diffusion region
15: Diffusion subelement
16: Hologram record medium
17: Hologram region
18: Hologram subregion
19: Illumination object subregion
21: Interference fringe pattern
25: Beam expander
26: First condensing lens
27: Lens array
28: Polygon mirror
29: Second condensing lens
30: Light diffusion element

The invention claimed is:

1. An illumination device comprising:
a coherent light source that emits a coherent beam;
an optical element including a plurality of diffusion subelements, wherein each of the diffusion subelements guides the coherent beam incident thereon such that the coherent beam illuminates a different illumination object subregion; and
an optical scan unit that guides the coherent beam emitted from the coherent light source and thereby scans the coherent beam on the plurality of diffusion subelements,
wherein the plurality of diffusion subelements include diffusion subelements differing in size,
wherein the plurality of diffusion subelements differ from each other in a light distribution direction, and the different illumination object subregions are separately illuminated, and
wherein the plurality of diffusion subelements are selectively illuminated with the coherent beam guided by the optical scan unit such that the corresponding different illumination object subregions are selectively illuminated with the coherent beam.

2. The illumination device according to claim 1, wherein an output power of the coherent beam emitted from the coherent light source is constant.

3. The illumination device according to claim 1, further comprising an optical scan control unit that controls the optical scan unit so as to control a light irradiation position of the coherent beam on the plurality of diffusion subelements.

4. The illumination device according to claim 1, wherein:
the optical element is a hologram record medium, and
the plurality of diffusion subelements are hologram subelements having interference fringe patterns different from each other.

5. The illumination device according to claim 1, wherein:
each of the plurality of diffusion subelements is a lens array including a plurality of lenses, and
the optical element is a lens array set including a plurality of lens arrays.

6. The illumination device according to claim 1, wherein a size of an incidence region for the coherent beam in each of the plurality of diffusion subelements is determined according to a light flux amount required in the corresponding illumination object subregion.

7. The illumination device according to claim 6, wherein the incidence region for the coherent beam in each of the plurality of diffusion subelements is larger with an increase in a light flux amount required in the corresponding illumination object subregion.

8. The illumination device according to claim 1, wherein the optical scan unit scans the coherent beam on the plurality of diffusion subelements at a constant speed.

9. The illumination device according to claim 8, wherein the optical scan unit includes a rotating body for guiding the coherent beam and scans the coherent beam on the plurality of diffusion subelements at the constant speed by maintaining an angular speed of the rotating body at a constant speed.

10. The illumination device according to claim 1, further comprising a light emission control unit that controls emission of the coherent beam from the coherent light source.

11. The illumination device according to claim 10, wherein the light emission control unit controls the emission of the coherent beam from the coherent light source according to a light irradiation position of the coherent beam on the plurality of diffusion subelements.

12. The illumination device according to claim 11, wherein the light emission control unit controls the emission of the coherent beam from the coherent light source according to the light irradiation position on the plurality of diffusion subelements so as to selectively irradiate the plurality of diffusion subelements with the coherent beam.

* * * * *